(12) United States Patent
Chen et al.

(10) Patent No.: US 8,018,601 B2
(45) Date of Patent: Sep. 13, 2011

(54) METHOD FOR DETERMINING VIBRATION DISPLACEMENT AND VIBRATING FREQUENCY AND APPARATUS USING THE SAME

(75) Inventors: Jin-Liang Chen, Hsinchu (TW); Liang-Chia Chen, Taipei County (TW); Huang-Chi Huang, Hsinchu (TW); Chun-Tai Lien, Taipei County (TW); Yong-Tong Zou, Taoyuan County (TW); Huang-Wen Lai, Taipei County (TW)

(73) Assignees: Industrial Technology Research Institute, Hsin-Chu (TW); National Taipei University of Technology, Taipei (TW)

( * ) Notice: Subject to any disclaimer, the term of this patent is extended or adjusted under 35 U.S.C. 154(b) by 308 days.

(21) Appl. No.: 12/478,847

(22) Filed: Jun. 5, 2009

(65) Prior Publication Data
US 2010/0085575 A1    Apr. 8, 2010

(30) Foreign Application Priority Data

Oct. 8, 2008    (TW) ............................... 97138634 A

(51) Int. Cl.
G01B 11/02    (2006.01)
(52) U.S. Cl. ........................ 356/498; 356/497
(58) Field of Classification Search ......... 356/484–486, 356/497–498, 511–514
See application file for complete search history.

(56) References Cited

U.S. PATENT DOCUMENTS

| 5,589,938 | A | 12/1996 | Deck | |
|---|---|---|---|---|
| 6,624,894 | B2 | 9/2003 | Olszak et al. | |
| 6,678,055 | B2 * | 1/2004 | Du-Nour et al. | 356/504 |
| 6,992,779 | B2 * | 1/2006 | Ueki | 356/512 |
| 7,006,232 | B2 * | 2/2006 | Rollins et al. | 356/479 |
| 7,321,430 | B2 | 1/2008 | Deck | |
| 7,545,505 | B2 * | 6/2009 | Lehmann et al. | 356/497 |
| 7,554,671 | B2 * | 6/2009 | Kadowaki et al. | 356/493 |
| 7,855,791 | B2 * | 12/2010 | Yeh et al. | 356/511 |

FOREIGN PATENT DOCUMENTS

| CN | 101319933 | | 12/2008 |
|---|---|---|---|
| JP | 07190712 A | * | 7/1995 |
| TW | 278682 | | 4/2007 |

* cited by examiner

*Primary Examiner* — Michael A Lyons
(74) *Attorney, Agent, or Firm* — WPAT, PC; Justin King

(57) ABSTRACT

A exemplary method for determining vibration displacement in interferometric scanning, in which two optical signals having a phase difference with each other of a high-coherence interferogram corresponding to a tested surface is detected for determining a shifting displacement between the reference plane of interferometric apparatus and the tested surface. In one embodiment, a series of the shifting displacements with respect to a time interval are measured for determining the vibrating frequency of the tested surface by spectrum analysis. Meanwhile, an exemplary interferometric apparatus is also disclosed for calculating the relative position between the tested surface and the reference plane of interferometric apparatus whereby the interferometric apparatus is capable of compensating influences of vibration caused by the environment or the tested surface itself so as to obtain the surface profile and vibration frequency of the tested surface.

25 Claims, 15 Drawing Sheets

2

```
┌─────────────────────────────────────────┐
│ modulating at least a light source for  │
│ generating simultaneously at least a    │
│ high-coherent inspection beam and at    │──── 20
│ least a low-coherent beam while         │
│ enabling the so-generated beams to      │
│ travel on a same optical path           │
└─────────────────────────────────────────┘
                    │
                    ▼
┌─────────────────────────────────────────┐
│ projecting the at least one high-       │
│ coherent inspection beam and the at     │──── 21
│ least one low-coherent beam onto a      │
│ tested surface through an               │
│ interferometric apparatus               │
└─────────────────────────────────────────┘
                    │
                    ▼
┌─────────────────────────────────────────┐
│ obtaining a high-coherent interferogram │──── 22
│ of the tested surface                   │
└─────────────────────────────────────────┘
                    │
                    ▼
┌─────────────────────────────────────────┐
│ performing a calculation according to   │
│ the light intensity of a specific area  │
│ on the high-coherent interferogram for  │
│ obtaining a shifting displacement       │──── 23
│ between a reference plane of            │
│ interferometric apparatus and the       │
│ tested surface                          │
└─────────────────────────────────────────┘
```

FIG.1

METHOD FOR DETERMINING VIBRATION DISPLACEMENT AND VIBRATING FREQUENCY AND APPARATUS USING THE SAME

TECHNICAL FIELD

The present disclosure relates to a method and apparatus for determining vibration displacement and vibration frequency of a tested surface in an interferometric scanning.

BACKGROUND

The conventional optical interferometric surface profilometer has been developed mainly for static measurement of nano-scale three-dimensional surface profiles. It has been widely employed for measuring surface roughness and uniformity on semiconductor wafers, depth of laser marks, metal-bump size and co-planarity during flip chip bonding, size and height of spacers in liquid-crystal display panels, and surface profile of fiber end-face and micro optical devices. Moreover, there are some low-coherent optical interferometric techniques capable of using a vertical scanning method enabled by a piezoelectric ceramics displacement sensor to measure broken heights that are not possible by conventional phase shifting method. In recent years, vibratory measurement has been incorporated into the optical interferometric surface profilometer, thus widening its applications in observing and measuring the vibratory behavior of functional elements and thin-films in micro-electro-mechanical system (MEMS) and micro-opto-electro-mechanical system (MOEMS) industries.

Although optical interferometer had been used in a vast range of applications for making precise measurement on parts being manufactured or used in those applications, the measurement resulting from such optical interferometer can be severely affected by environment vibration as it is inevitable during the operation or manufacturing of those parts, such as display panels, wafers, MEMS parts or optical parts. Under normal circumstance of measurement, even the slightest vibration can cause severe effect on the interferometric result even when the measurement is protected by anti-vibration facilities. Not to mention that the object being measured itself can sometimes being affected by certain voluntary vibration or be induced to vibrate passively which are not controllable by any anti-vibration facility. Therefore, there are already many researches in every advanced countries efforting to eliminate or reduce the adverse affect on the interferometric measurement caused by vibration.

One of which is an interferometric measurement apparatus having reduced sensitivity to vibration disclosed in U.S. Pat. No. 5,589,938, that it is capable of using two interferograms obtained from two cameras respectively by a fast and a slow data acquisition rates for reducing its sensitivity of measurement to vibration. Another such research is an interferometric method disclosed in U.S. Pat. No. 6,624,894, in which a reference signal is used to track the actual behavior of the scanner in an interferometer to produce scanner-position data that can be used to correct errors introduced by scanner non-linearities and other error sources. Moreover, in U.S. Pat. No. 7,321,430, a vibration resistant interferometric method is provided that it is capable of using an internal sensor or external sensor to determine the scanning position of its piezoelectric ceramics displacement sensor in an interferometer.

SUMMARY OF THE DISCLOSURE

In an exemplary embodiment, the present disclosure provides a method for determining vibration displacement in interferometric scanning, which comprises the steps of: modulating at least a light source for generating simultaneously at least a high-coherent inspection beam and at least a low-coherent inspection beam while enabling the so-generated beams to travel on a same optical path; projecting the at least one high-coherent inspection beam and the at least one low-coherent beam onto a tested surface through an interferometric apparatus; obtaining a high-coherent interferogram of the tested surface; performing a calculation according to the light intensity of a specific area on the high-coherent interferogram for obtaining a shifting displacement between a reference plane of interferometric apparatus and the tested surface.

In another exemplary embodiment, the present disclosure provides a method for determining vibration frequency of a tested surface in interferometric scanning, which comprises the steps of: performing a process for determining vibration displacement in interferometric scanning, wherein the process further comprises the steps the same as the aforesaid vibration displacement determination method; repeating the steps in the aforesaid process for multiple times for obtaining a time series capable of defining the relationship of shifting displacements with respect to time; and performing a spectrum analysis upon the time series for determining a vibration frequency of the tested surface.

In yet an exemplary embodiment, the present disclosure provides an interferometric apparatus, comprising: a light source module, capable of modulating at least a light source for generating simultaneously at least a high-coherent inspection beam and at least a low-coherent inspection beam that are traveling on a same optical path; an optical interferometric module, for guiding the at least one high-coherent inspection beam and the at least one low-coherent beam to project onto a tested surface for causing interference to generate an interferogram; a signal capturing unit, for capturing high-coherent interferometric light signal from a specific area in the interferogram; a calculation unit, coupled to the signal capturing unit for performing a calculation on the captured light signal so as to obtain a shifting displacement between a reference plane of interferometric apparatus and the tested surface; and a first imaging unit, for capturing images of the interferogram.

Further scope of applicability of the present application will become more apparent from the detailed description given hereinafter. However, it should be understood that the detailed description and specific examples, while indicating exemplary embodiments, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1 is a flow chart showing steps of a method for determining vibration displacement in interferometric scanning according to an embodiment.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

The present disclosure provides an exemplary embodiment of a method for determining vibration displacement in interferometric scanning, which projects a high-coherent inspection beam and a low-coherent inspection beam, that are traveling on the same optical path, onto a tested surface for using the high-coherent inspection beam to form a high-coherent interferogram and then using the light intensity detected from the high-coherent interferogram to perform a calculation so as to obtain a vibration displacement in interferometric scanning.

The present disclosure provides an exemplary embodiment of a method for determining vibration displacement in interferometric scanning, which is capable of detecting the light intensity of two phase-differentiated points in a high-coherent interferogram to be used in a calculation for determining a vibration displacement in interferometric scanning.

The present disclosure provides an exemplary embodiment of a method for determining vibration frequency of a tested surface in interferometric scanning, which utilizes the vibration displacements determined by the aforesaid interferometric vibration displacement determination method to establish a time series defining the relationship of those vibration displacements with respect to time to be used in a calculation for obtaining a vibration frequency of the tested surface.

The present disclosure provides an exemplary embodiment of an interferometric apparatus, adapted for exercising as a three-dimensional non-contact surface interferometric profiler, that is capable of performing a surface profile inspection when the inspected tested surface is moving or vibrating as it is configured with a band-pass filter and a instant displacement measuring device, so that the interferometric apparatus of the disclosure can be integrated with an optical interferometric surface roughness measuring instrument for compensating the displacement caused by environmental vibration during surface profiling.

The present disclosure provides an exemplary embodiment of an interferometric apparatus, being a device using low-coherent white light as its light source and capable of being integrated in any common interference microscope, so that not only its structural complexity is reduced, but also it can be manufactured with less cost. In addition, the interferometric apparatus of the disclosure can be configured with an instant displacement measuring device as an example, that is capable of cooperating with two optical fiber sets to receive narrow-band beams from a band-pass filter, and thus enabling the interferometric apparatus to detect the moving direction of an inspected tested surface.

Figure 1B:
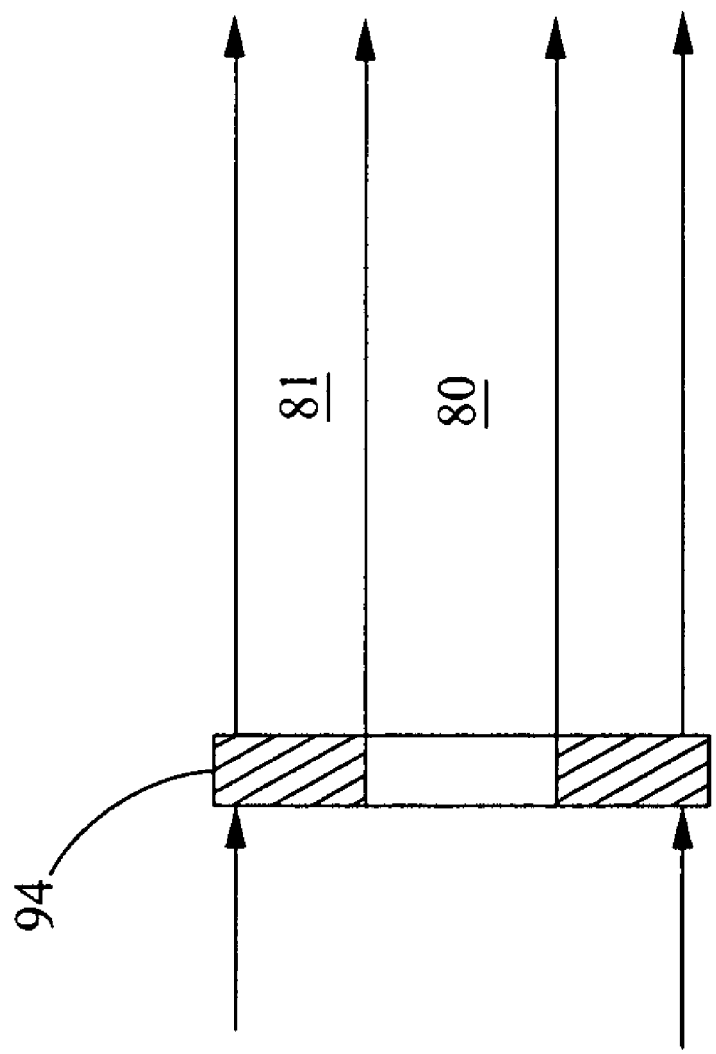
FIG. 1B is a schematic diagram showing a high-coherent inspection beam and a low-coherent inspection beam used in the present disclosure as they are traveling independent to each other but on the same optical path.

Please refer to FIG. 1, which is a flow chart showing steps of a method for determining vibration displacement in interferometric scanning according to an embodiment. In the exemplary embodiment, the method 2 starts from the step 20. At step 20, at least a light source is modulated for generating simultaneously at least a high-coherent inspection beam and at least a low-coherent inspection beam while enabling the so-generated beams to travel on a same optical path; and then the flow proceeds to step 21. It is noted that the modulation of the at least one light source performed in step 20 can be processed by filtering a low-coherent light, such as a white light LED or a halogen light, with a band-pass filter for generating the at least one high-coherent inspection beam and at least one low-coherent inspection beam; or by combining a beam emitted from a high-coherent light emitting diode and a white light LED or halogen light into a light traveling on the same optical path. However, as the light beams being combined are alternatively distributed in the combined light that the low-coherent inspection beams and the high-coherent inspection beams are not traveled independent to each other in the space of the optical path, it is required to use a band-pass filter for filtering the combined light so as to enable the low-coherent inspection beams and the high-coherent inspection beams to travel independent to each other, as shown in FIG. 1B. In FIG. 1B, the low-coherent inspection beam 80 is traveling independent to the high-coherent inspection beam 81. At step 21, the at least one high-coherent inspection beam and the at least one low-coherent beam are projected onto a tested surface through an interferometric apparatus; and then the flow proceeds to step 22. After the high-coherent inspection beam is projected onto the tested surface through the interferometric apparatus, which can be a Michelson interferometer, a Linnik interferometer, or a Mirau interferometer, it is reflected back to the interferometric apparatus where it is interfered with a reference beam generated from a beam splitter mirror of the interferometric apparatus at the time when the high-coherent inspection beam shine on the interferometric apparatus, by that a high-coherent interferogram is formed. At step 22, the high-coherent interferogram of the tested surface is captured; and then the flow proceeds to step 23. There are many devices capable of forming the interferogram, such as the Michelson interferometer, the Linnik interferometer, or the Mirau interferometer, and so on, whereas the interferogram is formed from the interference between an inspection beam reflected back from an inspected tested surface and a reference beam generated from a beam splitter mirror of the interferometric apparatus.

Figure 2B:
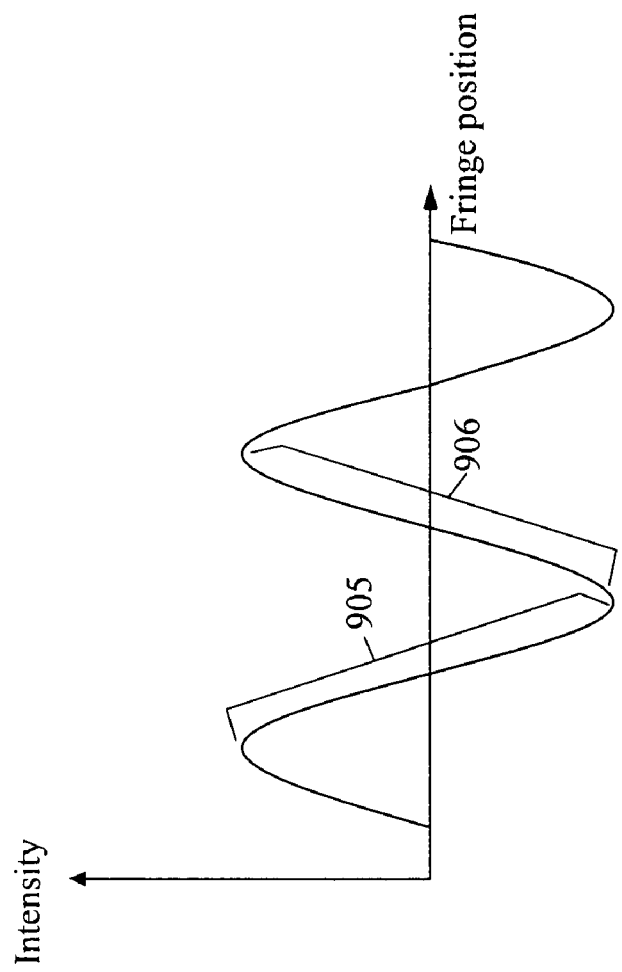
FIG. 2A to FIG. 2C are schematic diagrams relating to a high-coherent interferogram.
Figure 2A:
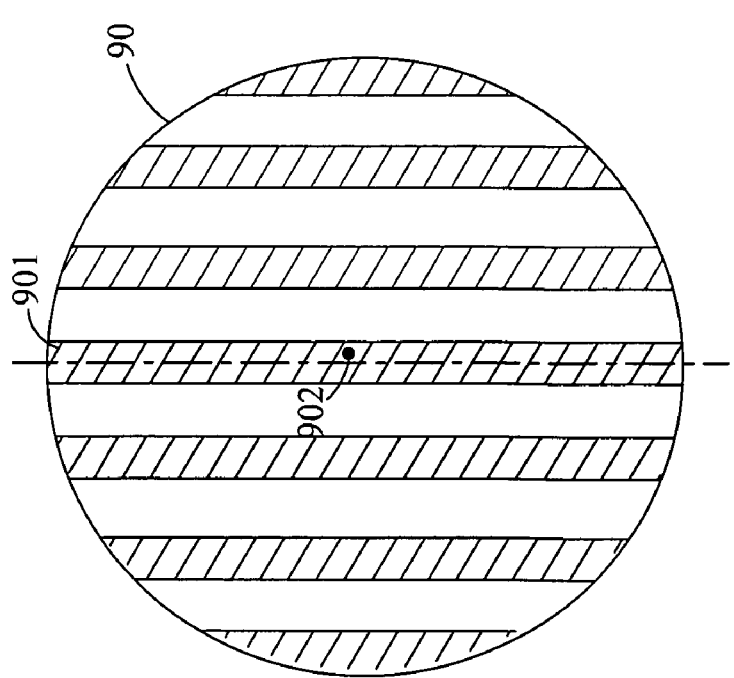

At step 23, a calculation is performed basing on the light intensity of a specific area on the high-coherent interferogram for obtaining a shifting displacement between a reference plane of interferometric apparatus and the tested surface. That is, one can use the light intensity of a point selected from the specific area, or the light intensity of any two points selected from the specific area only if there are phase difference between the two points, to be used in a calculation for obtaining a shifting displacement between a reference plane of interferometric apparatus and the tested surface. The so-called reference plane is not a specific plane, but can be any position on the interferometric apparatus where there is no relative displacement happening during the interferometric scanning as it is known to those skilled in the art. As the Mirau interferometer shown in FIG. 5A, its reference plane is the plane 4231 defined on an end surface of its interference lens set 4230. Moreover, in a Michelson interferometer shown in FIG. 12, its reference plane can be determined at any position as required as the plane 4232 shown in FIG. 12. Please refer to FIG. 2A and FIG. 2B, in which the shadowed areas in FIG. 2A represent the dark bands in the high-coherent interferogram 90 while the non-shadowed areas represent the bright bands. The selecting of only one point 902 from the specific area of the high-coherent interferogram 90 for using the light intensity of its light signal in a prior-art calculation for determining shifting displacement, can only suitable for small vibration displacement, e.g. when the vibration displacement is restricted within quarter wavelength as the range between the region 905 and region 906 shown in FIG. 2B.

Figure 2C:
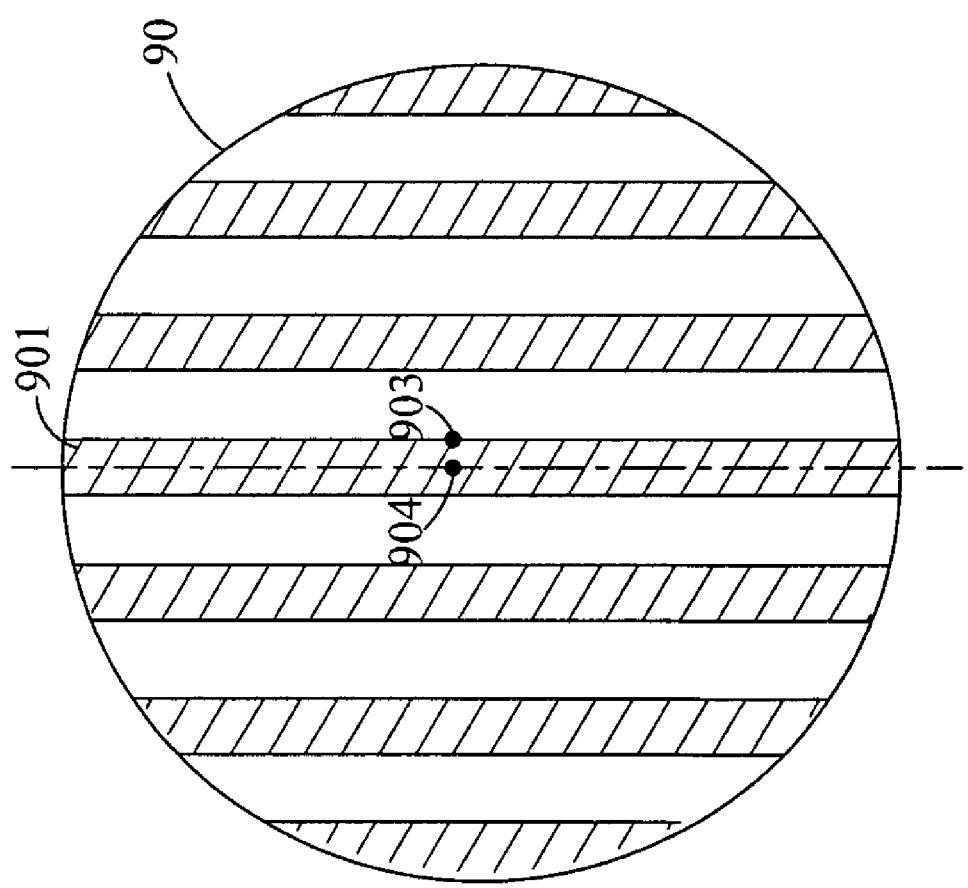

The situation relating to the selecting of two points with phase difference from the specific area is described in the following description with reference to FIG. 2C. In this embodiment, the specific area is the interference fringe 901 in the interferogram 90 and the two points 903, 904 are any two points in the interference fringe 901 whose phase difference is (360n+90) degrees, but they are not limited thereby.

The calculation perform in the step 23 regarding to the selecting of two points with phase difference from the specific area for determining a shifting displacement can adopted an algorithm disclosed in TW Pat. Pub. No. TW278682. That is, after the light intensity $I_A$ and $I_B$ of the selected two points 903, 904 are obtained by the use of optical sensor while registering and updating the relating maximum and minimum light intensity of the two, $M_j$(j=A, or B) and $m_j$(j=A, or B), the light intensity of the two can be adjusted by the following equations:

$$I_P = I_A - e_A; \quad (1)$$

$$I_Q = I_B - e_B; \quad (2)$$

wherein, $e_j = (M_j + m_j)/2$.

Thereafter, by using an outer ring 433 to adjust the phase difference between the two points 903, 904 to 90 degrees, the phase difference can be obtained by the following equation:

$$\Phi = \tan^{-1}(I_P/I_Q) \quad (3)$$

As soon as the value of the phase difference $\Phi$ is obtained, it is inputted to the equation $\Phi=(2d)*(2\pi/\lambda)$, whereas $\lambda$ is the average wavelength, and thereby, the shifting displacement d can be calculated and obtained in an instant manner. The shifting displacement d represents the displacement of the tested surface caused by the vibration from its surrounding environment at the time when the high-coherent interferogram is imaged and thus obtained.

Figure 3:
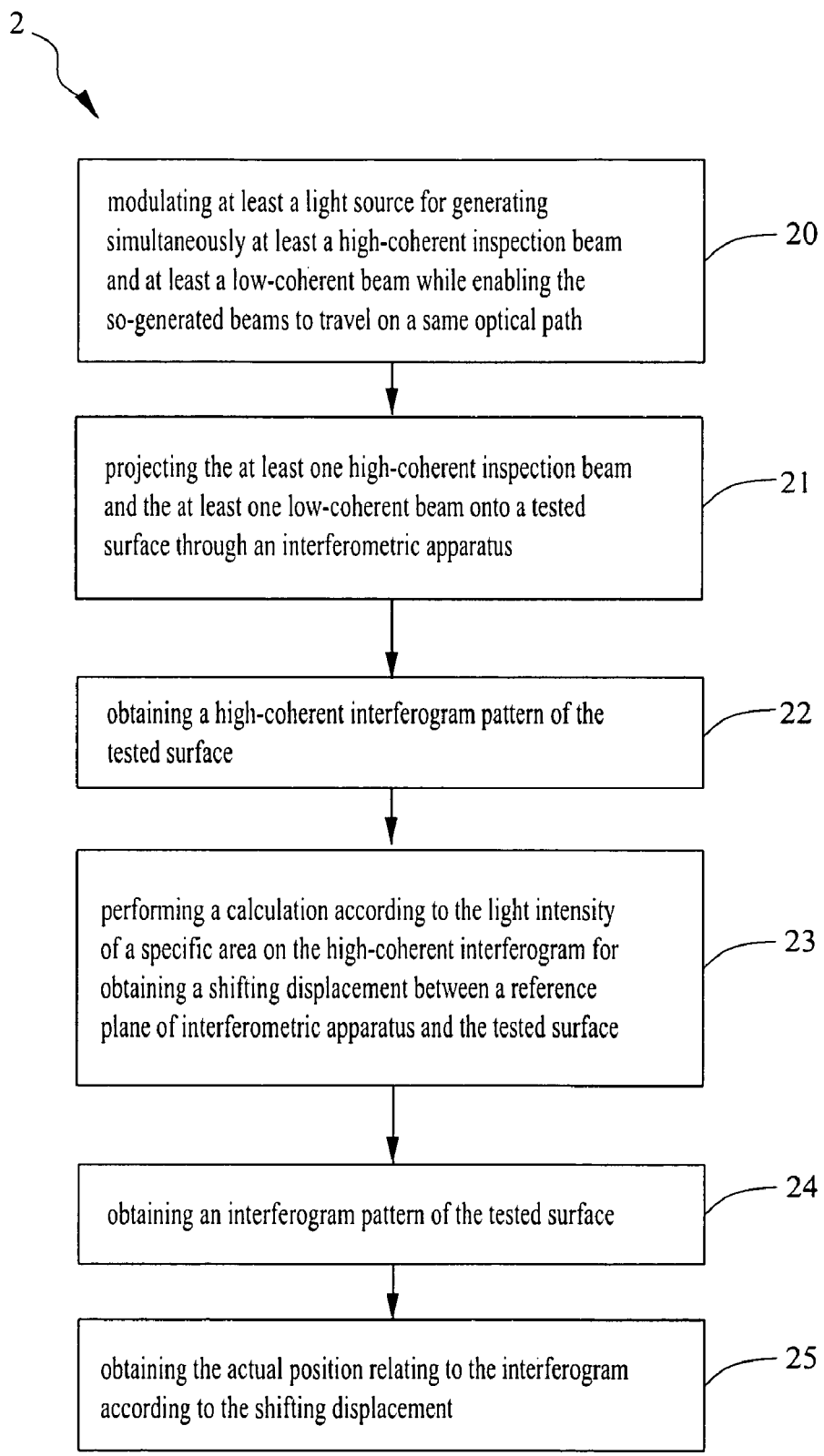
FIG. 3 is a flow chart showing steps of a method for determining vibration displacement in interferometric scanning according to another embodiment.

Please refer to FIG. 3, which is a flow chart showing steps of a method for determining vibration displacement in interferometric scanning according to another embodiment. The method shown in the embodiment of FIG. 3 is similar to that shown in FIG. 1, but is different in its step 24 proceeding after the step 23. At step 24, an interferogram of the tested surface, which can be a low-coherent interferogram or a high-coherent interferogram, is obtained and used in a calculation for acquiring information relating to the relative height on the inspected surface of the tested surface; and then the flow proceeds to step 25. It is noted that the low-coherent interferogram in the step 24 can be obtained by the interference between a low-coherent reference beam in an interferometric apparatus and another low-coherent beam emitted from a white light source that is reflected back from the tested surface after it is projected through the interferometric apparatus on the tested surface. In this exemplary embodiment, the single low-coherent light can be a white light beam emitted from a white light source, which is then being guided to a band-pass filtering unit for causing a high-coherent inspection beam and a low-coherent inspection beam to be generated. However, it is noted that the type of the low-coherent light source and the generation of the two inspection beams are not limited by the aforesaid manner. Thus, the high-coherent interferogram in the step 24 can be obtained by the interference between a reference beam in an interferometric apparatus and the high-coherent inspection beam that is reflected back from the tested surface after it is projected through the interferometric apparatus on the tested surface.

At step 25, the actual position relating to the interferogram is obtained according to the shifting displacement. In those prior-art interferometric techniques, such as the vertical scanning of white-light interferometry, its resulting interferograms are good for reconstructing the 3D profile of an object. However, as those interference images acquired can be easily affected by vibration caused by surrounding environments or voluntary vibration of the object itself, inaccurate measurements can be resulted if so and thus will cause severe error in the resulting reconstructed 3D profile of the object. Nevertheless, as the shifting displacement caused by vibration can be obtained in step 23, such shifting displacement is used in the step 25 for compensating the distance between the tested surface and the reference plane on the interferometric apparatus that are caused by vibration at the time when the corresponding interferogram is formed, and thereby, the inaccurate measurement can be calibrated and thus the accuracy for reconstructing 3D profile of the object is improved. It is noted that the compensation performed in the step 25 is not achieved by adjusting the position of its interferometric lens set or the position of the inspected object, but is achieved by the calculation of a software for acquired directly the actual position relating to the low-coherent interferogram to be used in the reconstructing of the 3D profile of the object.

Figure 4:
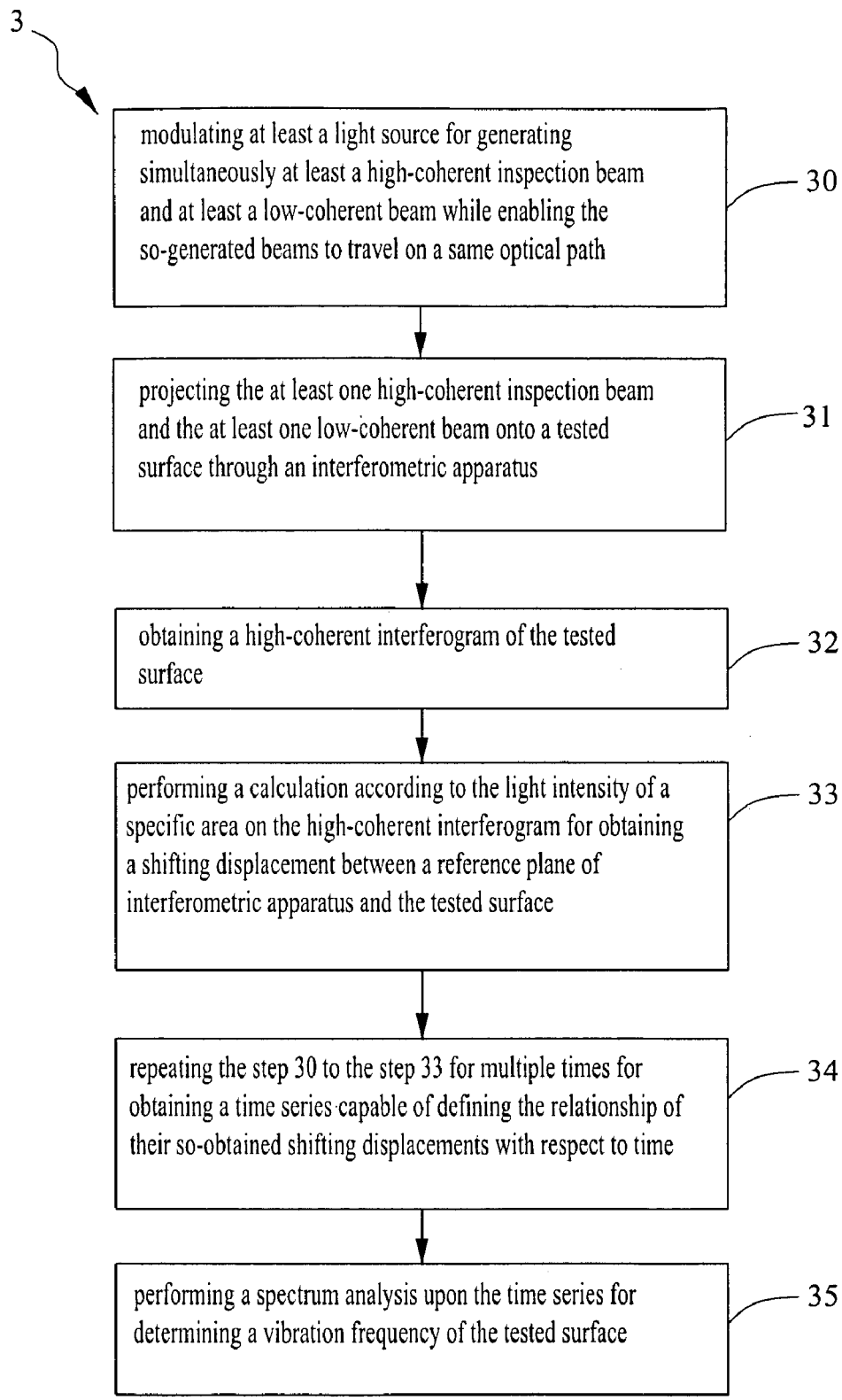
FIG. 4 is a flow chart showing steps of a method for determining vibration frequency of a tested surface in interferometric scanning according to an embodiment.

Please refer to FIG. 4, which is a flow chart showing steps of a method for determining vibration frequency of a tested surface in interferometric scanning according to an embodiment. The step 30 to the step 33 of the method 3 shown in the embodiment of FIG. 4 is the same as the step 20 to the step 23 of the method 2 shown in FIG. 1, but is different in its step 34 proceeding after the step 33. At step 34, the process including the step 30 to the step 33 is repeated for multiple times for obtaining a time series capable of defining the relationship of their so-obtained shifting displacements with respect to time; and then the flow proceeds to step 35. Similarly, the shifting displacements obtain the step 34 are obtained by the use of the light intensity of a point selected from the high-coherent interferogram in a calculation, or by the use of the light intensity of any two points selected from the high-coherent interferogram only if there are phase difference between the two points. At step 35, a spectrum analysis is performed upon the time series for determining a vibration frequency of the tested surface. As the relationship between the shifting displacement and time is obtained in step 34, it is used in a spectrum analysis for analyzing the vibration pattern of the tested surface and thus obtains its vibration frequency. It is noted that the spectrum analysis for obtaining vibration frequency is a technique known to those skilled in the art, and thus will not be described further herein.

Figure 5A:
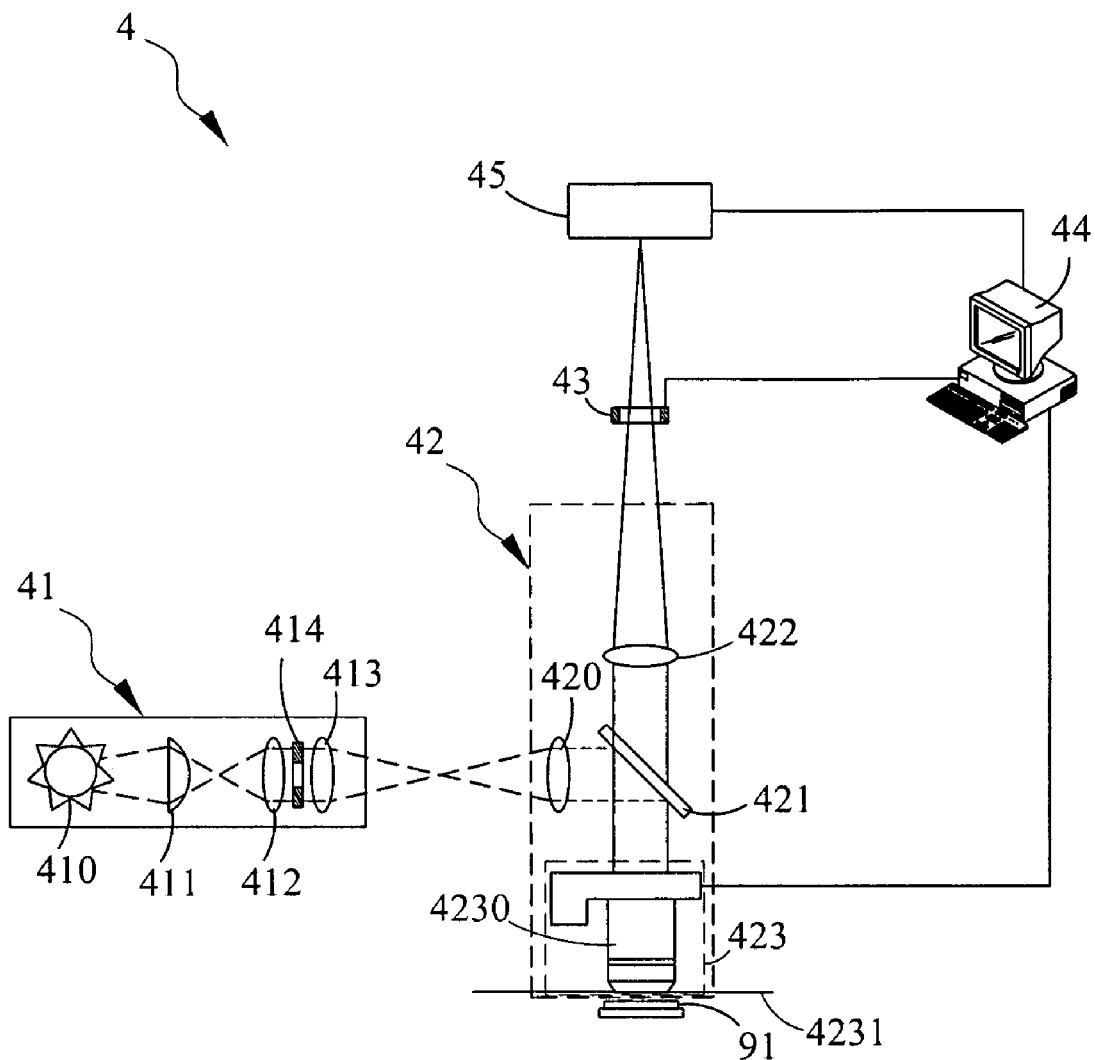
FIG. 5A is a schematic view of an interferometric apparatus according to an embodiment.

Please refer to FIG. 5A, which is a schematic view of an interferometric apparatus according to an embodiment. The interferometric apparatus 4 of the embodiment comprises: a light source module 41, an optical interferometric module 42, a signal capturing unit 43, a calculation unit 44, and a first imaging unit 45. The light source module 41 is capable of modulating a light for generating simultaneously at least a high-coherent inspection beam and at least a low-coherent inspection beam that are traveling on a same optical path, which is further comprised of: a light source 410, a plurality of the three lenses 411, 412 and 413 shown in this embodiment, and a band-pass filtering unit 414. In this embodiment, the light source 410 is used for emitting the low-coherent light, which can be a halogen light or an LED light capable of emitting white light. Nevertheless, for preventing an extremely short exposure in a high speed imaging process from causing insufficient light intensity for detecting displacement in real time, the light source 410 should be a high power light source. Moreover, the three lenses 411~413 are disposed at positions for receiving the low-coherent light, by which as the lens 411 is a plano-convex lens and the two lenses 412, 413 are bi-convex lenses, the low-coherent light from the white light source 410 is narrowed and collimated by the plural lenses 411~413 for preventing it form diverging.

Figure 5B:
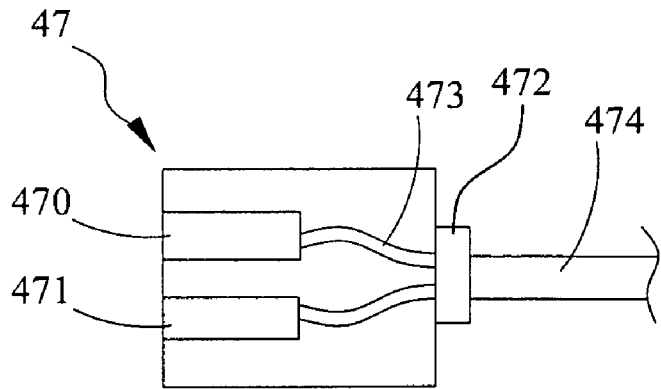
FIG. 5B is a schematic diagram showing a light source used in the interferometric apparatus of the disclosure.
Figure 6:
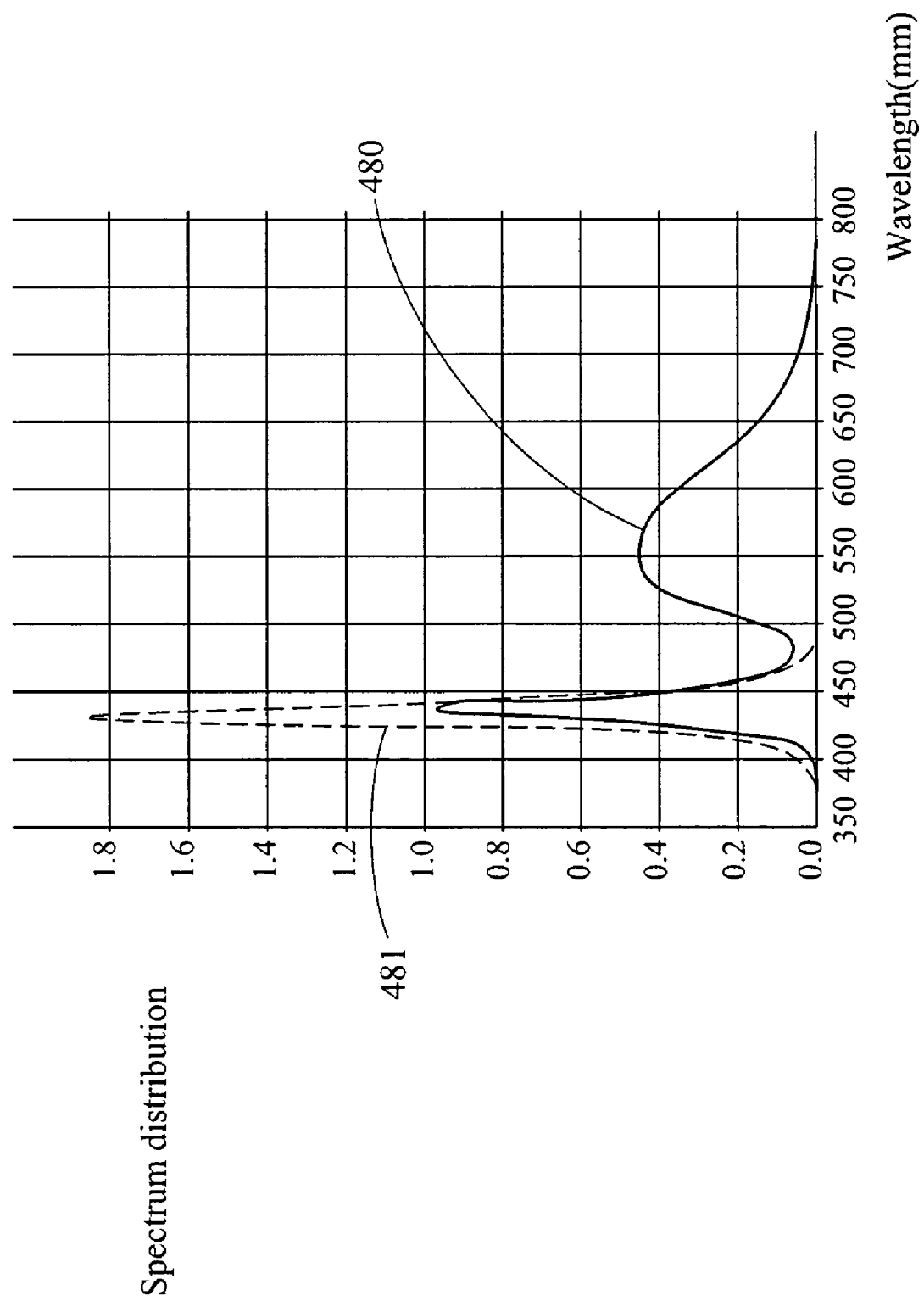
FIG. 6 is a schematic diagram showing the spectrum distribution of a low-coherent light and a high-coherent light.

Please refer to FIG. 5B, which is a schematic diagram showing a light source used in the interferometric apparatus. The light source 47 of FIG. 5B comprises: a first light source 470, for emitting a low-coherent light; a second light source 471, for emitting a high-coherent light; and a fiber optic coupler 472. In this embodiment, the first light source 470 can be a white light source or a halogen light source, but is not limited thereby; and the second light source 471 can be light emitting diode capable of emitting blue light or other wavelength light. In addition, the fiber optic coupler 472 being coupled with the first light source 470 and the second light source 471, is used for combining the low-coherent light and the high-coherent light to travel on the same optical path. It is noted that the fiber optic coupler 472 used in this embodiment can be any prior-art fiber optic coupler capable of combing beams inputted therein from different light sources using fibers 473 and then projecting the combined light 474 out of the same. Thereby, the spectrum of the resulting combined light 474 is the combination of wide-band spectrum and narrow-band spectrum. As shown in FIG. 6, the curve 480 represents the wide-band spectrum indicating the low-coherent light, and the curve 481 represents the narrow-band spectrum indicating the high-coherent light. As the spectral intensity of the narrow-band high-coherent light is stronger than that of the wide-band low-coherent light, the problem resulting from an extremely short exposure in a high speed imaging process that causes insufficient light intensity for detecting displacement in real time can be solved. Therefore, the light source 47 of this embodiment can replace the light source 410 shown in FIG. 5A.

Figure 7A:
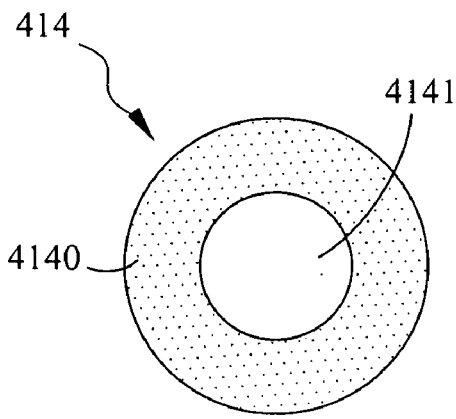
FIG. 7A and FIG. 7B show different band-pass filtering units used in the disclosure.
Figure 7B:
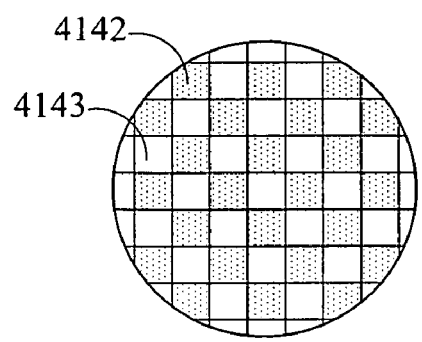

As for the band-pass filtering unit 414 in FIG. 5A, it is disposed at a position between the lens 412 and the lens 413 to be used for modulating the light form the light source 410 into a high-coherent inspection beam and a low-coherent inspection beam, as shown in FIG. 1B. In FIG. 7A, the band-pass filtering unit 414 is composed of a first region 4140 and a second region 4141, in which there is no coating on the second region 4141 so that it can allow the low-coherent part of the light from the light source to pass therethrough and thus form the low-coherent inspection beam while the first region 4140 is coated for allowing only light whose wave band is limited in a small range to pass so as to form the high-coherent inspection beam. Accordingly, the portion of light passing the first region 4140 forms the high-coherent inspection beam; and the portion of light passing the second region 4141 forms the low-coherent inspection beam. In addition, the band-pass filtering unit 414 can be formed as an array in a manner that the region 4142 and the region 4143 can respectively only allow beams of different wave bands to pass therethrough for example, as shown in FIG. 7B. Thus, by the array-type band-pass filtering unit 414 shown in FIG. 7B, there can be a plurality of low-coherent inspection beams and a plurality of high-coherent inspection beams being generated from the signal light emitted from the light source 410. It is noted that embodiments of the present disclosure can adopt a band-pass filtering unit other then the ring-like device shown in FIG. 7A and the array-type device shown in FIG. 7B, that it can be of any structure as it is actually required and known to those skilled in the art.

Figure 12:
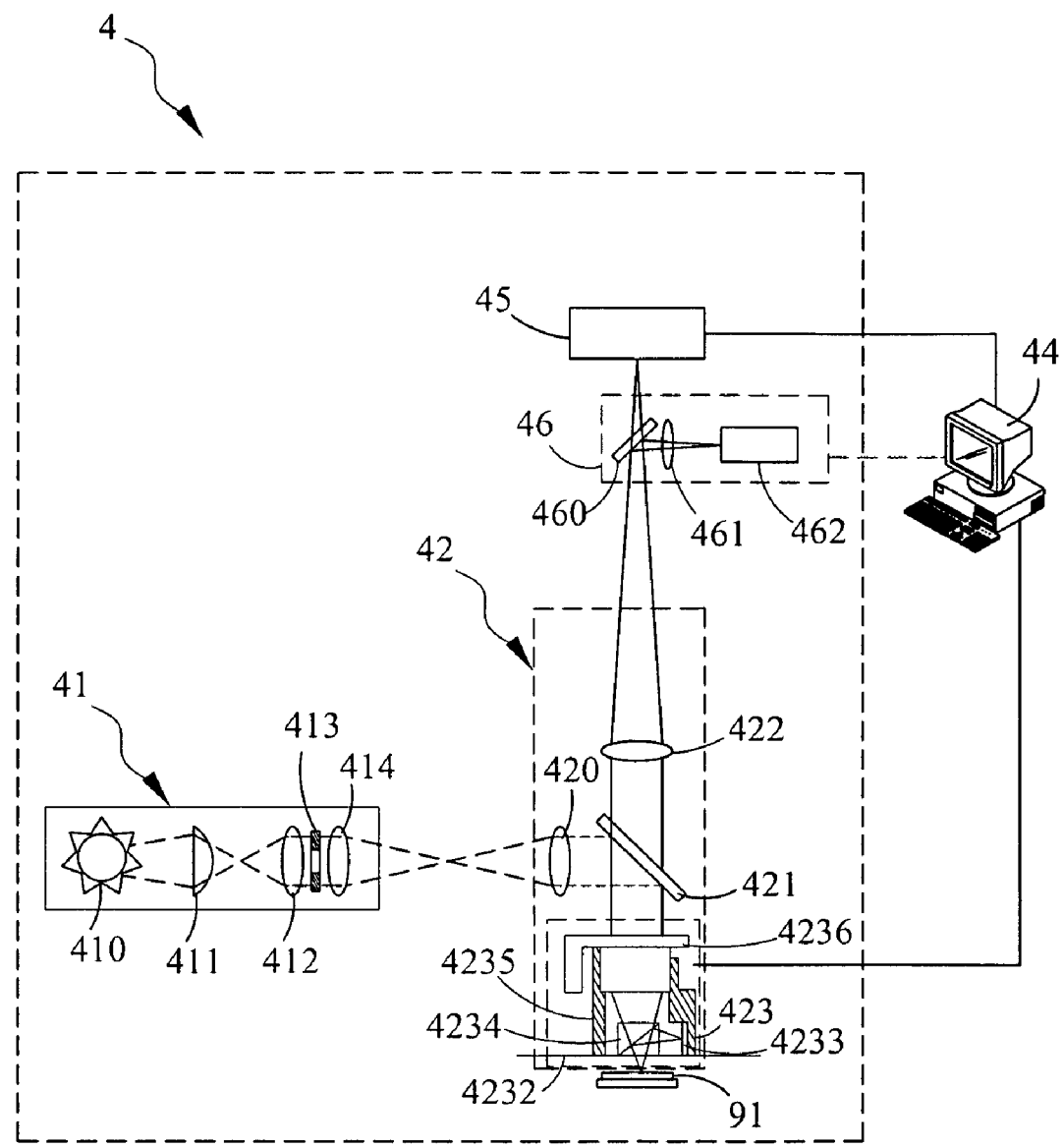

The optical interferometric module 42 further comprises: a plurality of lenses, as the two lenses 420, 422 shown in FIG. 5A; a beam splitter 421 and a interferometer 423, by which the high-coherent inspection beam and the low-coherent inspection beam originated from the light source module 41 is guided to project on a tested surface 91 through the interferometer 423 so as to form simultaneously a high-coherent interferogram and a low-coherent interferogram. In this embodiment, the interferometer can be a Mirau interferometer or a Michelson interferometer, but is not limited thereby. As shown in FIG. 12, the interferometer 423 is composed of a interference lens set 4235 and a piezoelectric element 4236, in which the interference lens set 4235, being comprised of a reference reflection mirror 4233 and a beam splitter 4234 to be used for inducing interference, is a device known to those skilled in the art and thus is not described further herein.

Figure 7C:
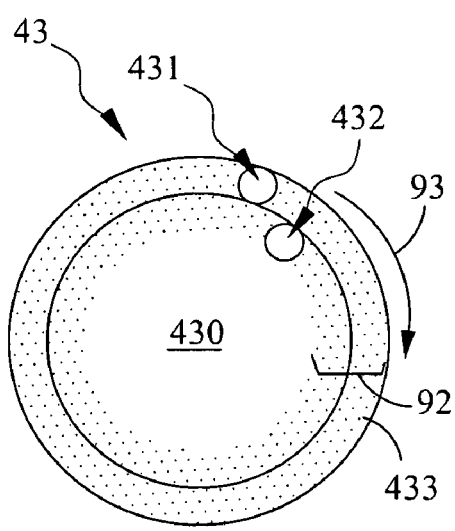
FIG. 7C and FIG. 7D show two different views of the rotary frame of the signal capturing unit used in the disclosure.

The beam splitter 421 is disposed at a side of the lens 420 for guiding the light passing through the lens 420 to the interferometer 423 and therethrough to the tested surface 91. The lens 422 is disposed at a position between the beam splitter 421 and the signal capturing unit 43, which is used for focusing the interferometric light passing through the beam splitter onto the first imaging unit 45. It is noted that the first imaging unit can be a CCD or CMOS sensor. The signal capturing unit 43 is disposed at a position between the lens 422 and the first imaging unit 45 to be used for capturing two phase-differentiated light signals from the interferogram. Please refer to FIG. 7C and FIG. 7D, which show two different views of the rotary frame of the signal capturing unit used in the present disclosure. In this embodiment, the signal capturing unit 43 is comprised of: a rotary frame 430, a first light-guide unit 431 and a second light-guide unit 432, in which the rotary frame 430 is provided for the interferometric light passing through the lens 422 to form a high-coherent interferogram and a low-coherent interferogram on the rotary frame 430. Moreover, at a region of the rotary frame 430 where the high-coherent interferogram is formed, it is configured with an outer ring 433 in a manner that it is capable of being driven to rotate about the circumference of the rotary frame 430 by an adjusting motion. Although the signal capturing unit 43 shown in this embodiment is shaped like a disc, but it is not limited thereby. In addition, by arranging the first light-guide unit on the outer ring 433 and the second light-guide unit 432 on the rotary frame 430, two different light signals with respect to two different locations of the high-coherent interferogram can be detected so that the two light signals with desired phase difference are obtained.

Figure 7D:
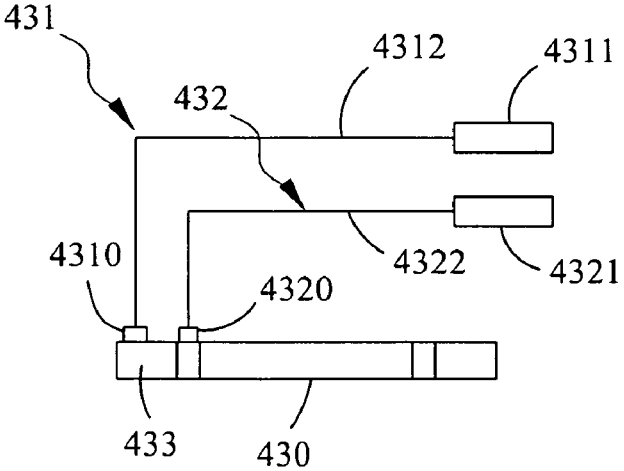

In FIG. 7D, the first light-guide unit 431 is composed of a holder 4310, an optical sensor 4311 and a optical fiber 4312 while the second light-guide unit 432 is composed of a holder 4320, an optical sensor 4321 and a optical fiber 4322, in which the holder 4320 is mounted on the rotary frame 430 at a position corresponding to the high-coherent interferogram while another holder 4310 is mounted on the outer ring 433 at a position also corresponding to the high-coherent interferogram. Moreover, both the optical fibers 4312, 4322 are connected respectively to the holders 4310, 4320 by an end thereof while connecting another end thereof to their corresponding optical sensors 4311, 4321; and the optical sensors 4311, 4321 are further connected to the calculation unit 44. As there are changes in the interference fringes during the scanning, the phase difference between the two light signals can be adjusted by the rotation of the outer ring 433, and then the obtained light signals are send to the optical sensors 4311, 4321 through the optical fibers 4312, 4322 where they are converted into electric signals. It is noted that the first light-guide unit 431 and the second light-guide unit 432 can be optical sensors to be used for directly converting the light signals into electric signal to be received by the calculation unit 44. Although the aforesaid structure is used for detecting the light intensity of two phase-differentiated points, it can be used for detecting a single light signal.

As shown in FIG. 5A, the calculation unit 44 is coupled to the signal capturing unit 43, by that the calculation unit 44 is capable of performing a calculation basing on the captured light signals so as to obtain a shifting displacement between the reference plane 4231 of interferometric apparatus and the tested surface 91. It is noted that the calculation is the same as the previous description, and thus is not described further herein. The first imaging unit 45, being electrically coupled to the calculation unit 44, is used for capturing images of the interferogram. In this embodiment, as the so-formed interferogram contains a high-coherent interferogram and a low-coherent interferogram, the calculation unit 44 is able to calculate and use a vibration-originated shifting displacement to compensate the measurement of the surface roughness of the tested surface basing upon the information containing in the low-coherent interferogram for reconstructing the 3D profile of the tested surface 91.

Figure 8A:
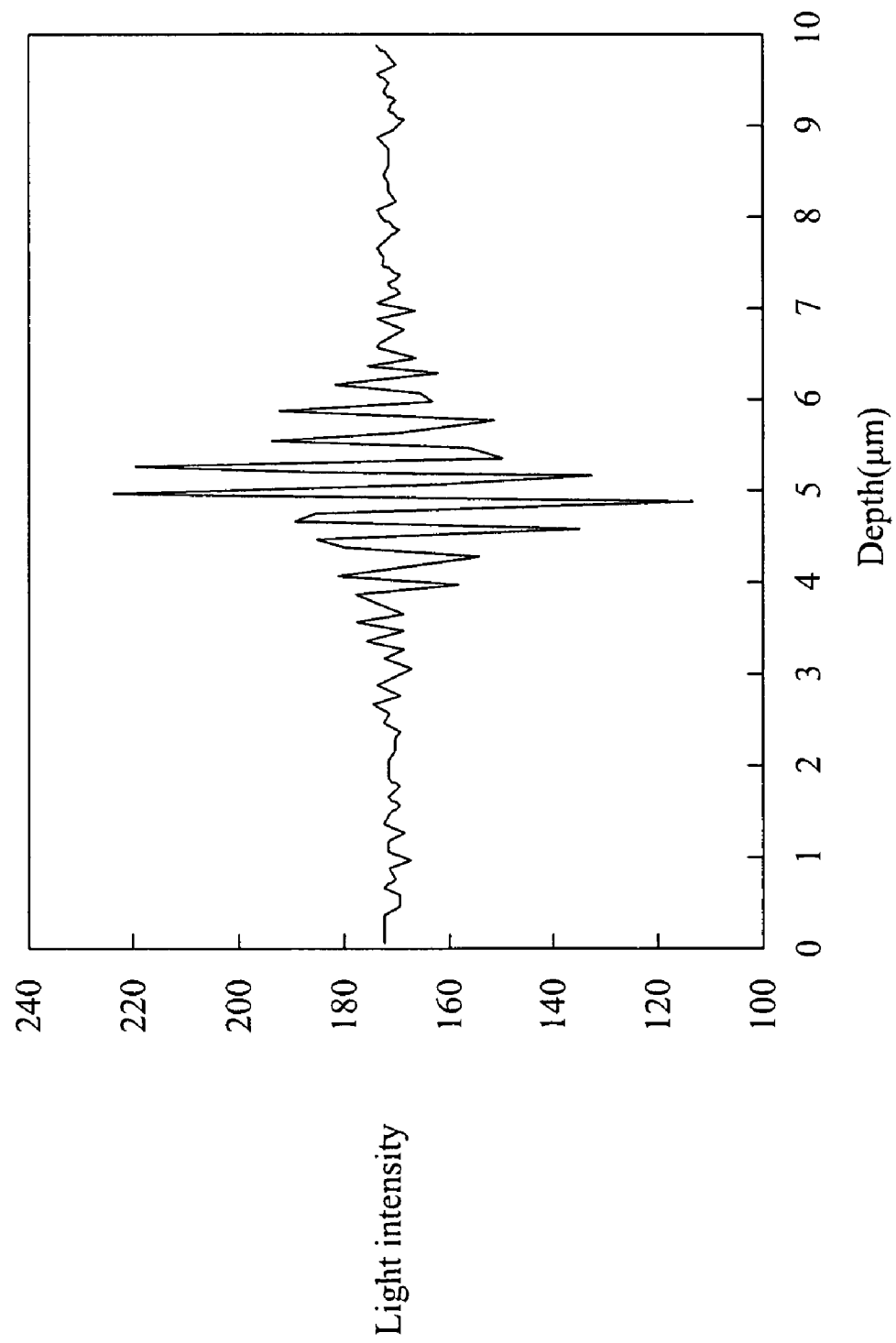
FIG. 8A is a diagram showing the relationship between light intensity of a single pixel and depth when the light intensity is captured by a signal capturing unit without band-pass filtering unit.
Figure 8B:
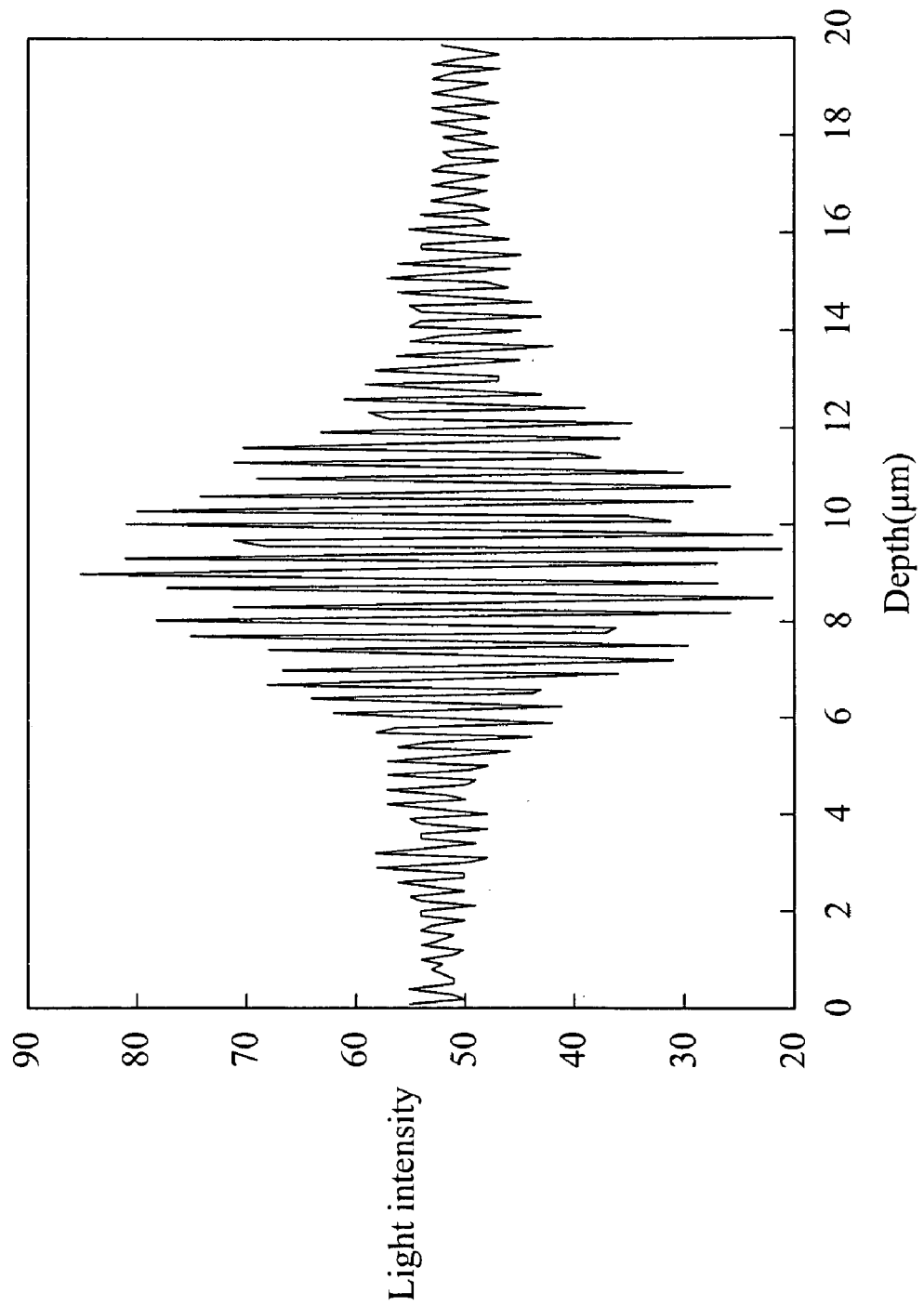
FIG. 8B is a diagram showing the relationship between light intensity of a single pixel and depth when the light intensity is captured by a signal capturing unit with band-pass filtering unit.

FIG. 8A is a diagram showing the relationship between light intensity of a single pixel and different depths when the light intensity is captured by a signal capturing unit without band-pass filtering unit. FIG. 8B is a diagram showing the relationship between light intensity of a single pixel and different depths when the light intensity is captured by a signal capturing unit with band-pass filtering unit. In FIG. 8A, the light intensity of a low-coherent white light is distributed within a comparatively narrow range that its coherence length is shorter and it is noted that the interference can only occur when the optical path difference between the inspection beam and a reference beam is smaller that the coherence length. As shown FIG. 8B, after the inspection light from the white light source is filtered by a band-pass filtering unit, its coherence length is increased which is used as base for compensating the error caused by vibration in an interferometric apparatus during a vertical scanning.

Figure 9:
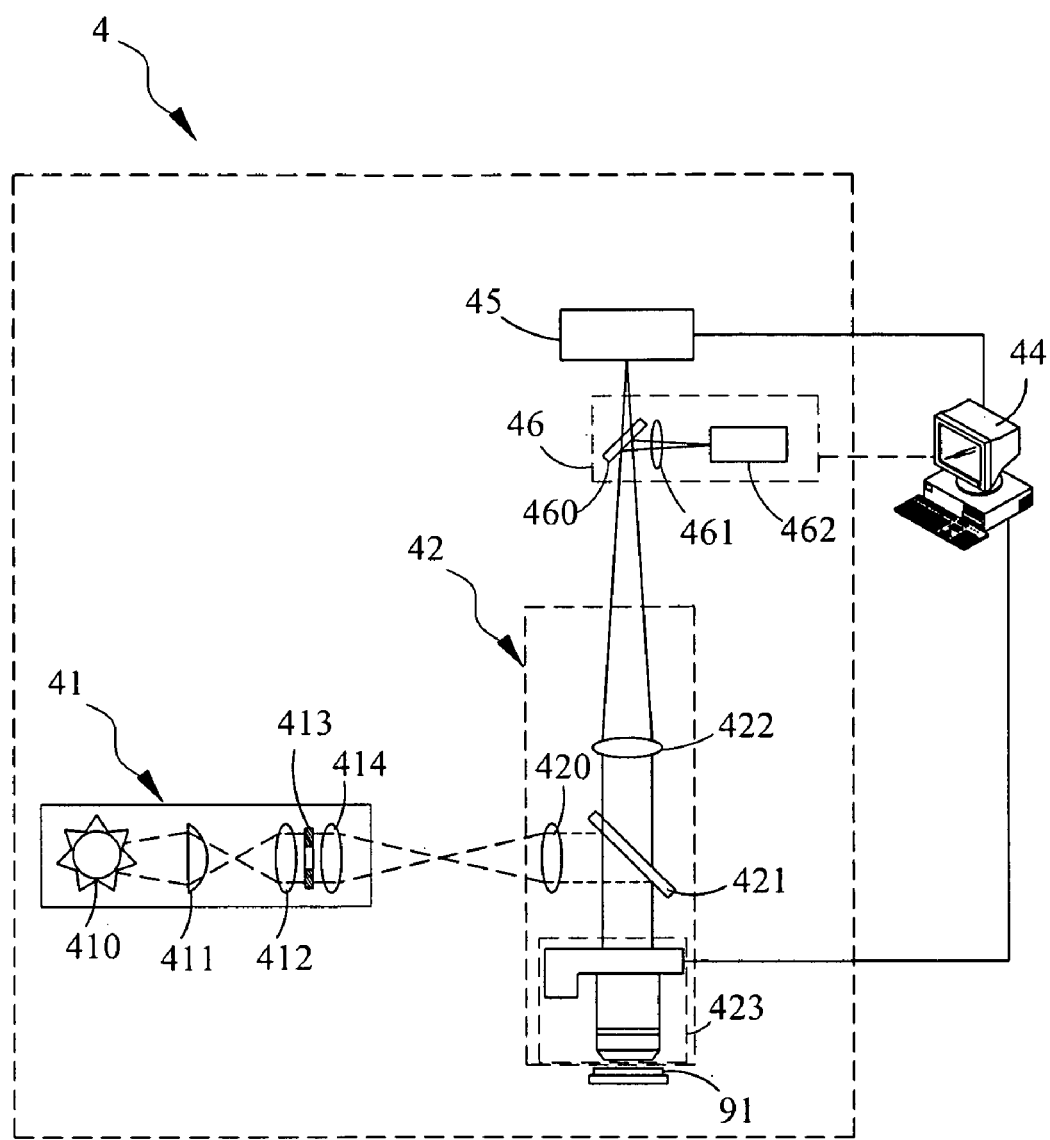
FIG. 9 is a schematic view of an interferometric apparatus according to another embodiment.
Figure 10:
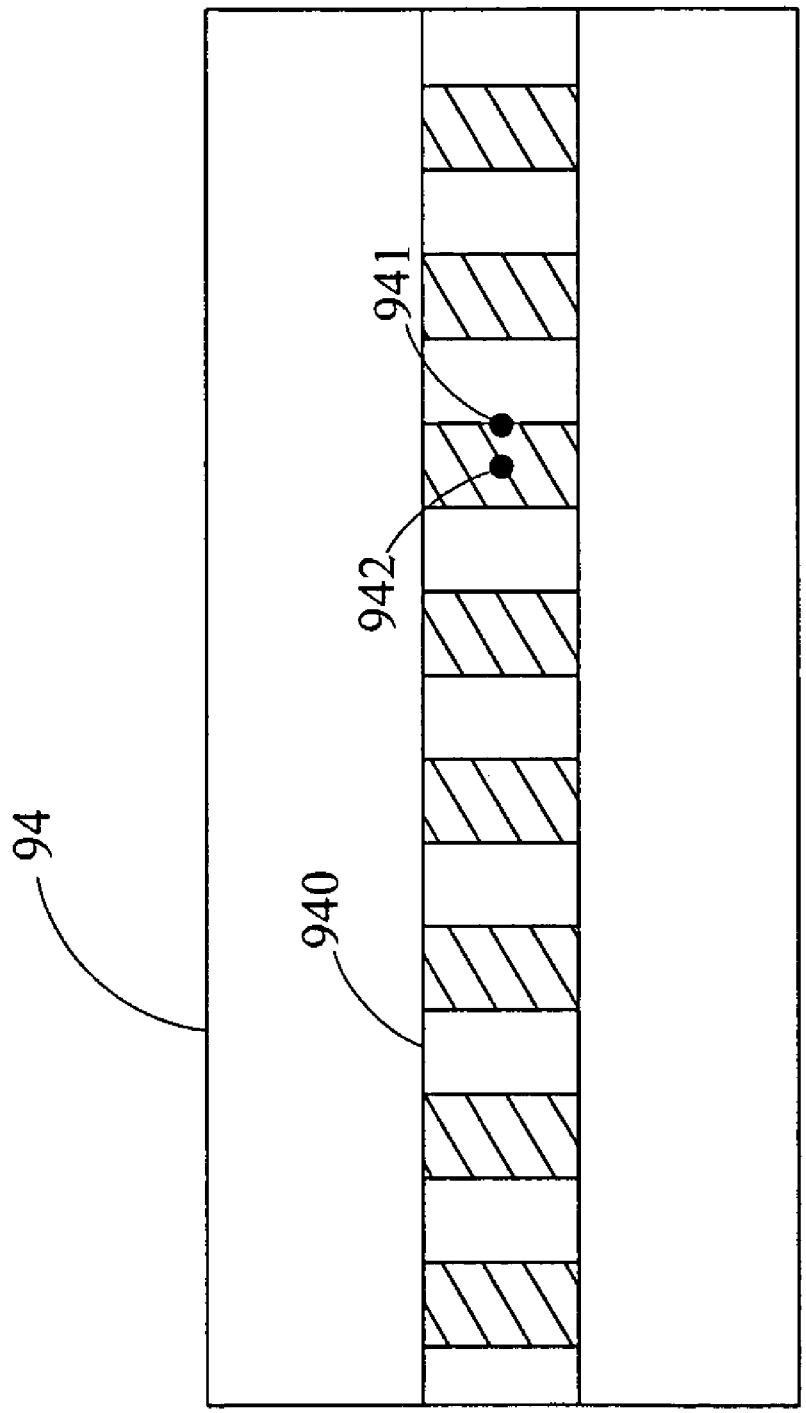
FIG. 10 is a schematic diagram showing an image area captured by a second imaging unit of the disclosure.

Please refer to FIG. 9, which is a schematic view of an interferometric apparatus according to another embodiment. The aforesaid interferometric apparatus is similar to the one shown in FIG. 5A, but is different in its signal capturing unit 46. The signal capturing unit 46 in this embodiment includes a beam splitter 460, a lens 461 and a second imaging unit 462. The second imaging unit 462 is a high speed camera. The beam splitter 460 can divide the interferometric light into two beams while guiding one of the two beams to the first imaging unit 45 and the other beam to the lens 461 for forming a high-coherent interferogram to be captured by the second imaging unit 462. As shown in FIG. 10, the region 94 defined a range capable of being imaged by the second imaging unit 462, in which the area 940 represents the interference fringes captured by the second imaging unit 462. It is possible to select two points 941, 942 in the imaging area 940 whose phase difference is 90 degrees, and then a shifting displacement can be obtain by performing the calculation described in FIG. 1 basing upon the light intensity of two selected points 941, 942.

Figure 11:
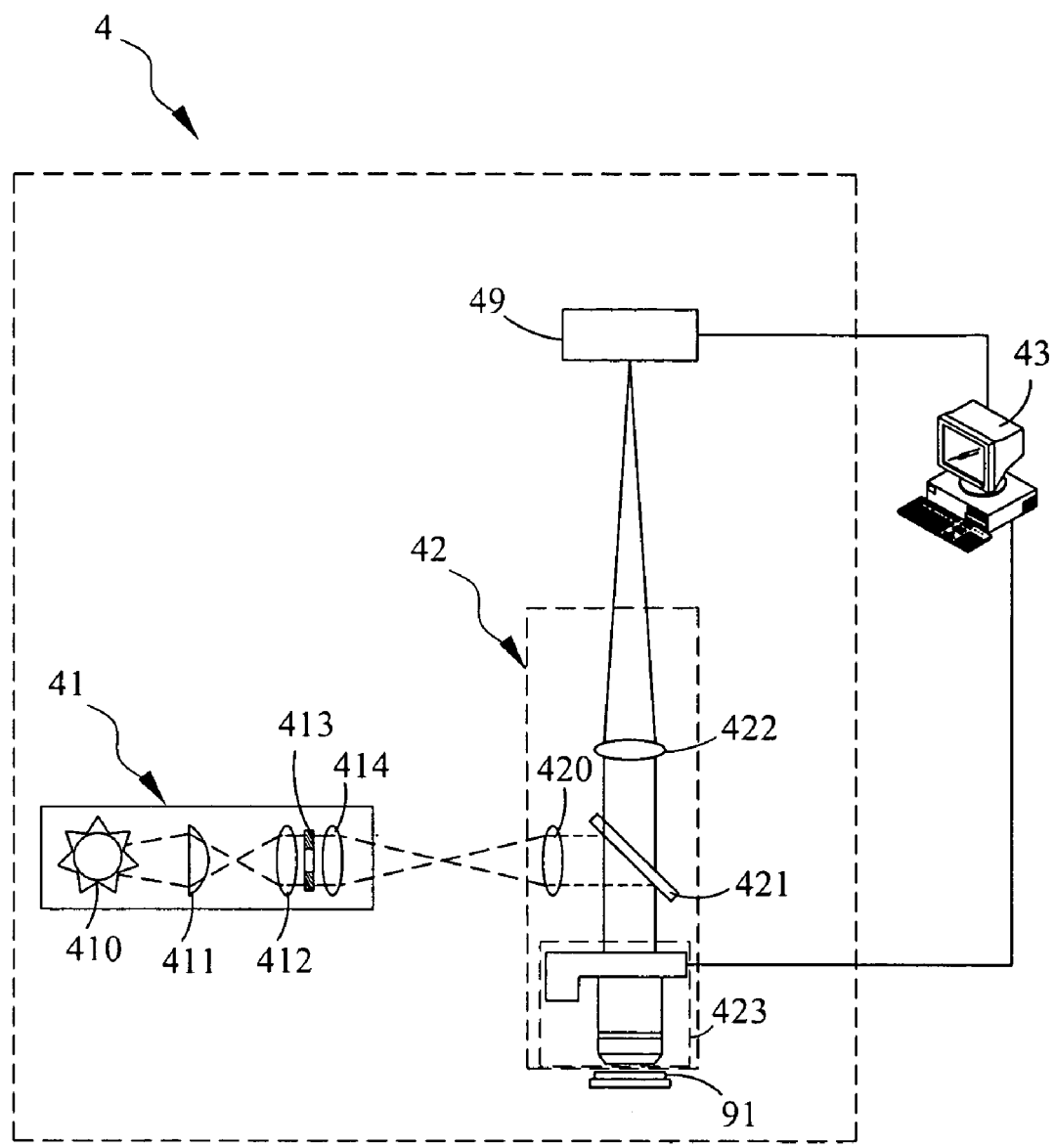
FIG. 11 and FIG. 12 are schematic view of two interferometric apparatuses according to further two embodiments.

Please refer to FIG. 11, which is a schematic view of an interferometric apparatuses according to one further embodiment. The interferometric apparatus in this embodiment is similar to the one shown in FIG. 5A, but is different in that: the interferometric apparatuses of FIG. 11 use only a single imaging unit 49 for carrying on those proceedings performed by the first imaging unit 45 and the second imaging unit 462 in the interferometric apparatuses of FIG. 9, so that the single imaging unit 49 is a device integrating the first imaging unit 45 and the second imaging unit 462.

To sum up, as the interferograms can be easily affected by vibration caused by surrounding environments or voluntary vibration of the object itself during interferometric scanning, inaccurate measurements can be resulted and thus will cause severe error in the resulting reconstructed 3D profile of the object. The present disclosure provides exemplary embodiments of methods and apparatus for determining vibration displacement and vibration frequency of a tested surface in an interferometric scanning, by which the shifting displacement caused by vibration can be obtained and used for compensating the error caused by vibration, and thereby, the inaccurate measurement can be calibrated for improving the accuracy for reconstructing 3D profile of the object.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for determining vibration displacement in interferometric scanning, comprising at least the steps of:
    modulating at least a light source for generating simultaneously at least a high-coherent inspection beam and at least a low- coherent inspection beam while enabling the so-generated beams to travel on a same optical path;
    projecting the at least one high-coherent inspection beam and the at least one low-coherent beam onto a tested surface through an interferometric apparatus; obtaining a high-coherent interferogram of the tested surface; and
    performing a calculation according to the light intensity of a specific area on the high-coherent interferogram for obtaining a shifting displacement between a reference plane of the interferometric apparatus and the tested surface.

2. The method of claim 1, wherein the specific area includes a light signal.

3. The method of claim 1, wherein the specific area includes two light signals having a phase difference.

4. The method of claim 3, wherein a value of the phase difference is 90 degrees.

5. The method of claim 1, further comprising the steps of:
obtaining a low-coherent interferogram of the tested surface; and
obtaining the actual scanning position for acquiring the low-coherent interferogram according to the shifting displacement.

6. The method of claim 1, wherein the modulating of the at least one light source is performed by guiding the at least one light beam to travel passing through a band-pass filtering unit.

7. A method for determining vibration frequency of a tested surface in interferometric scanning, comprising at least the steps of:
modulating at least a light source for generating simultaneously at least a high-coherent inspection beam and at least a low-coherent inspection beam while enabling the so-generated beams to travel on a same optical path;
projecting the at least one high-coherent inspection beam and the at least one low-coherent beam onto the tested surface through an interferometric apparatus; obtaining a high-coherent interferogram of the tested surface;
performing a calculation according to the light intensity of a specific area on the high-coherent interferogram for obtaining a shifting displacement between a reference plane of the interferometric apparatus and the tested surface;
repeating the previous four steps for multiple times for obtaining a time series capable of defining the relationship of their so-obtained shifting displacements with respect to time; and
performing a spectrum analysis upon the time series for determining a vibration frequency of the tested surface.

8. The method of claim 7, wherein the specific area includes a light signal.

9. The method of claim 7, wherein the specific area includes two light signals having a phase difference.

10. The method of claim 9, wherein a value of the phase difference is 90 degrees.

11. The method of claim 7, wherein the modulating of the at least one light source is performed by guiding the at least one light beam to travel passing through a band-pass filtering unit.

12. An interferometric apparatus, at least comprising:
a light source module, capable of modulating at least a light source for generating simultaneously at least a high-coherent inspection beam and at least a low-coherent inspection beam that are traveling on a same optical path;
an optical interferometric module, for guiding the at least one high-coherent inspection beam and the at least one low-coherent beam to project onto a tested surface for forming interference to generate an interferogram;
a signal capturing unit, for capturing a high-coherent interferometric light signal from a specific area in the interferogram;
a calculation unit, coupled to the signal capturing unit for performing a calculation based on the captured light signals so as to obtain a shifting displacement between a reference plane of the interferometric apparatus and the tested surface; and
a first imaging unit for capturing images of the interferogram.

13. The interferometric apparatus of claim 12, wherein the interferogram is composed of at least a high-coherent interferogram and at least a low-coherent interferogram.

14. The interferometric apparatus of claim 12, wherein the light source module further comprises:
a light source, for emitting the at least one light beam;
a plurality of lenses, for receiving the at least one light beam emitted from the light source; and
a band-pass filtering unit, disposed between the plural lenses for modulating the at least one light source into the at least one high-coherent inspection beam and the at least one low-coherent beam.

15. The interferometric apparatus of claim 12, wherein the light source module further comprises:
a first light source, for emitting a low-coherent light;
a second light source, for emitting a high-coherent light;
a fiber optic coupler, coupled with the first light source and the second light source for combining the low-coherent light and the high-coherent light into a combined light beam and traveling on a same optical path;
a plurality of lenses, disposed on the optical path; and
a band-pass filtering unit, disposed between the plural lenses for modulating the combined light beam into the at least one high-coherent inspection beam and the at least one low-coherent beam while enabling the at least one high-coherent inspection beam to be distributed surrounding the periphery of the low-coherent inspection beam.

16. The interferometric apparatus of claim 15, wherein the first light source is a light source selected from the group consisting of: a white light emitting diode and a halogen light source.

17. The interferometric apparatus of claim 15, wherein the second light source is a monochromatic light-emitting diode.

18. The interferometric apparatus of claim 12, wherein the optical interferometric module further comprises:
a plurality of lenses; and
a beam splitter, disposed between the plural lenses for simultaneously splitting and projecting the at least one high-coherent inspection beam and the at least one low-coherent beam to an interferometric unit and then to the tested surface where they are reflected back to the interferometric unit to form respectively a high-coherent interferometric light and a low-coherent interferometric light while guiding the two to travel passing the beam splitter to be captured by the signal capturing unit and the first imaging unit, respectively.

19. The interferometric apparatus of claim 12, wherein the signal capturing unit further comprises:
a rotary frame, provided for the interferogram containing a high-coherent interferogram and a low-coherent interferogram to be formed on a region thereof while the region is configured with an outer ring capable of being driven to rotate about the circumference of the rotary frame by an adjusting motion;
a first light-guide unit, disposed on the outer ring for detecting signals relating to the high-coherent interferogram; and
a second light-guide unit, disposed on the rotary frame for detecting signals relating to the high-coherent interferogram.

20. The interferometric apparatus of claim 19, wherein the first light-guide unit further comprises:
a holder, disposed on the rotary frame at a position correspond to the high-coherent interferogram;
an optical sensor, connected to the calculation unit; and
an optical fiber, connecting to the holder by an end thereof while connecting another end thereof to the optical sensor.

21. The interferometric apparatus of claim 19, wherein the second light-guide unit further comprises:
   a holder, disposed on the outer ring at a position correspond to the high-coherent interferogram;
   an optical sensor, connected to the calculation unit; and
   an optical fiber, connecting to the holder by an end thereof while connecting another end thereof to the optical sensor.

22. The interferometric apparatus of claim 12, wherein the signal capturing unit further comprises:
   a second imaging unit, coupled to the calculation unit; and
   a beam splitter, capable of guiding respectively the interferogram to the first imaging unit and the second imaging unit.

23. The interferometric apparatus of claim 12, wherein the specific area includes a light signal.

24. The interferometric apparatus of claim 12, wherein the specific area includes two light signals having a phase difference.

25. The interferometric apparatus of claim 24, wherein a value of the phase difference is 90 degrees.

* * * * *